United States Patent
Nakanishi et al.

(10) Patent No.: US 6,665,028 B2
(45) Date of Patent: Dec. 16, 2003

(54) OPTICAL DIFFUSING PLATE COMPRISING BIREFRINGENT FILM AND SIDE CHAIN TYPE LIQUID CRYSTAL POLYMER THEREIN

(75) Inventors: Sadahiro Nakanishi, Ibaraki (JP); Minoru Miyatake, Ibaraki (JP); Shusaku Nakano, Ibaraki (JP); Amane Mochizuki, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 24 days.

(21) Appl. No.: 10/041,817

(22) Filed: Jan. 7, 2002

(65) Prior Publication Data

US 2002/0130995 A1 Sep. 19, 2002

(30) Foreign Application Priority Data

Jan. 16, 2001 (JP) ......................... 2001/007956

(51) Int. Cl.[7] ............... G02F 1/1335; C09K 19/02; C09K 19/00; G02B 5/30
(52) U.S. Cl. ................ 349/112; 349/117; 359/494; 428/1.3
(58) Field of Search ................ 349/112, 177, 349/123, 124; 359/494; 428/1.31, 1.3; 252/299

(56) References Cited

U.S. PATENT DOCUMENTS

| 2,123,902 | A | | 7/1938 | Land ................ 359/500 |
| 6,236,439 | B1 | * | 5/2001 | Saiki et al. ............ 349/117 |
| 6,361,838 | B1 | * | 3/2002 | Miyatake et al. ........ 428/1.31 |
| 6,369,945 | B1 | * | 4/2002 | Sakuramoto et al. ...... 359/494 |
| 6,392,802 | B2 | * | 5/2002 | Miyatake et al. ........... 359/494 |

FOREIGN PATENT DOCUMENTS

| EP | 0 980 868 A1 | 2/2000 |
| EP | 1 055 721 A2 | 11/2000 |
| JP | 9-274108 | 10/1997 |
| JP | 11-174211 | 7/1999 |
| JP | 2000-17003 | 1/2000 |
| JP | 2000-187105 | 7/2000 |
| JP | 2001-213919 | 8/2001 |
| JP | 2001-354732 | 12/2001 |
| WO | WO 87/01822 | 3/1987 |

\* cited by examiner

Primary Examiner—Tarifur R. Chowdhury
(74) Attorney, Agent, or Firm—Knobbe Martens Olson & Bear, LLP

(57) ABSTRACT

An optical diffusing plate that gives a anisotropic scattering of a linearly polarized light and has an excellent diffusion property in a scattering direction, and that is suitable for improving visibility, brightness of a liquid crystal display, comprising a birefringent film and a minute domain with a birefringent characteristic different from the birefringent film in a dispersed state in the birefringent film, the minute domain comprising a side chain type liquid crystal polymer comprising a monomer unit (a) containing a liquid crystalline fragment side chain and a monomer unit (b) containing a non-liquid crystalline fragment side chain, and a refractive index difference ($\Delta n1$) between the birefringent film and the minute domain in a direction orthogonal to a direction of axis that gives a maximum transmittance of linearly polarized light being 0.03 or more, and a refractive index difference ($\Delta n2$) in a direction of axis that gives a maximum transmittance being 80% or less of the $\Delta n1$.

18 Claims, 2 Drawing Sheets

OPTICAL DIFFUSING PLATE COMPRISING BIREFRINGENT FILM AND SIDE CHAIN TYPE LIQUID CRYSTAL POLYMER THEREIN

BACKGROUND OF THE INVENTION

1. Field of the Invention

The present invention relates to an optical diffusing plate that gives an anisotropic scattering of a linearly polarized light and has an excellent diffusion property in a scattering direction, and that is suitable for improving visibility, brightness etc. of a liquid crystal display etc. Moreover, the present invention relates to an optical element using the optical diffusing plate concerned.

2. Description of the Prior Art

Conventionally, an optical diffusing plate designed so that anisotropic scattering might be given to a linearly polarized light by making a domain with a refractive index anisotropy contained in a dispersed state in a base material has been known. As the optical diffusing plate concerned; an optical diffusing plate that comprises a combination of a thermoplastic resin and a low molecular weight liquid crystal, that comprises a combination of a low molecular weight liquid crystal and a photo-curable low molecular weight liquid crystal and that comprises a combination of a polyvinyl alcohol and a low molecule liquid crystal, have been known (U.S. Pat. No. 2,123,902 specification, WO 87/01822 official gazette, JP-A 9-274108).

What is expected in the above-mentioned optical diffusing plate is that supplying a linearly polarized light in a state difficult to be absorbed by a polarizing plate reduces an absorption loss, and consequently the brightness of a liquid crystal display is improved. It is expected using this method that the following conventional problems may be solved; a problem based on a large wavelength dependability of a cholesteric liquid crystal in the conventional absorption loss reduction systems in which a cholesteric liquid crystal layer and a quarter wavelength plate are used, and especially, problems that transmitted light is chromatic from oblique direction and that these cannot be applied to a reflected type liquid crystal display etc. However, in the above-mentioned conventional optical diffusing plate, there were problems of a difficulty in manufacturing, and of a practical usability in difficult handling with a poor functional stability, when applied in a liquid crystal display, etc.

As an optical diffusing plate in which the above-mentioned problem was solved, an optical diffusing plate using a birefringent film that contains minute domains with different birefringent characteristics in a dispersed state is proposed (JP-A 2000-187105). Although the above-mentioned problem is solved and excellent polarization characteristics are developed using this optical diffusion plate, the further improvement is desired about polarization characteristics.

SUMMARY OF THE INVENTION

An object of the present invention is to provide an optical diffusing plate that is easily manufactured and has outstanding thermal and chemical stability and is excellent in practical use or is excelled in polarization characteristics, and in which while brightness is increased as a result of supplying linearly polarized light with reduced absorption loss by polarizing plate, chromatic problem is rarely induced, and that is applicable to reflected type liquid crystal display etc.

And another object of the present invention is to provide an optical element and further a liquid crystal display using the above-mentioned optical diffusing plate.

As a result of repeated examinations carried out wholeheartedly by the present inventors to solve the above-mentioned problems, it was found out, as is shown below, that the above-mentioned object was attained and the present invention was completed using an optical diffusing plate in which a side chain type liquid crystal copolymer is used as a minute domain contained in dispersed state in a birefringent film.

Namely, the present invention relates to an optical diffusing plate comprising a birefringent film and a minute domain with a birefringent characteristic different from the birefringent film in a dispersed state in the birefringent film, the minute domain comprising a side chain type liquid crystal polymer comprising a monomer unit (a) containing a liquid crystalline fragment side chain and a monomer unit (b) containing a non-liquid crystalline fragment side chain, and a refractive index difference ($\Delta n1$) between the birefringent film and the minute domain in a direction orthogonal to a direction of axis that gives a maximum transmittance of linearly polarized light being 0.03 or more, and a refractive index difference ($\Delta n2$) in a direction of axis that gives a maximum transmittance being 80% or less of the $\Delta n1$.

Since the minute domain and the birefringent film that contains the dispersed minute domain is formed by a polymer materials and a forming material has an excellent handling property, the birefringent film is easily manufactured using an optical diffusing plate of the present invention. Since the forming material has a thermal and chemical stability, it develops stable optical function and excels in practicality. Moreover, a linearly polarized light transmits in the direction of the axis ($\Delta n2$ direction) that gives a maximum transmitance of the linearly polarized light, while maintaining an excellent polarization state, and the linearly polarized light is scattered in the direction ($\Delta n1$ direction) orthogonal to the above-mentioned $\Delta n2$ direction based on a refractive index difference $\Delta n1$ between a birefringent film and a minute domain, and as a result the polarization state is relaxed or canceled.

And moreover since a side chain type liquid crystal copolymer contains a monomer unit (b), it becomes possible to provide a birefringent characteristic smaller than the one obtained using only a side chain type liquid crystal polymer consisting of a monomer unit (a) independently. Consequently, since the birefringent characteristic of a side chain type liquid crystal copolymer may be controlled to a desired value of birefringence, it becomes possible to manufacture an optical diffusing plate with outstanding polarization characteristic.

In the above-mentioned optical diffusing plate, it is preferable that a minute domain is distributed in a dispersed and state caused by phase separation, and that a length in $\Delta n1$ direction of the minute domain (direction orthogonal to the above-mentioned axial direction) is from 0.05 to 500 µm.

The above-mentioned optical diffusing plate may be used as one layer, two or more layers may be used in laminated state so that the $\Delta n1$ direction of an upper layer and a lower layer may have a mutually parallel relationship in order to increase polarization characteristics.

Moreover, the present invention relates to an optical element comprising a laminated layer of at least one kind selecting from a polarizing plate and a retardation plate, and the above mentioned optical diffusing plate.

In the above-mentioned optical element, it is desirable that transmission axis of the polarizing plate and the Δn2 direction of the optical diffusing plate (the above-mentioned axial direction) have a mutually parallel relationship.

When a polarizing plate is configured to an optical diffusing plate so that the transmission axis may have a relationship parallel to the above-mentioned Δn2 direction, a linearly polarized light that has transmittance in the Δn2 direction transmits polarizing plate efficiently and a linearly polarized light that has transmittance in the above-mentioned Δn1 direction is scattered, and the polarization direction is transformed. Consequently since the linearly polarized light becomes to contain a linearly polarized light component that has a transmittance in the Δn2 direction, the component light is transmitted through the polarizing plate.

Furthermore, the present invention relates to a liquid crystal display comprising the above-mentioned optical diffusing plate or the above-mentioned optical element on one side or both sides of liquid crystal cells.

When the above-mentioned polarizing plate is used, an amount of the transmitted linearly polarized light is increased and an absorption loss is reduced simultaneously, the brightness of a transmitted type liquid crystal display etc. can be raised. Moreover, a possible chromatic problem based on high wavelength dependability as in cholesteric liquid crystal becomes rarely to be induced. Furthermore, the above-mentioned polarizing plate is easily applicable also in a reflected type liquid crystal display etc., and a liquid crystal display with outstanding brightness and visibility may be stably obtained.

DETAILED DESCRIPTION OF THE INVENTION

An optical diffusing plate of the present invention comprises a minute domain contained in dispersed state in a birefringent film having different birefringent characteristics from the birefringent film, the minute domain comprises a side chain type liquid crystal polymer comprising a monomer unit (a) containing a liquid crystalline fragment side chain, and a monomer unit (b) containing a non-liquid crystalline fragment side chain, and a refractive index difference (Δn1) between the above-mentioned birefringent film and the minute domain in a direction orthogonal to a direction of axis that gives a maximum transmittance of linearly polarized light is 0.03 or more, and a refractive index difference (Δn2) in a direction of axis that gives a maximum transmittance is 80% or less of the above-mentioned Δn1.

Figure 1:
FIG. 1 is a sectional view of an example of an optical diffusing plate.
Figure 2:
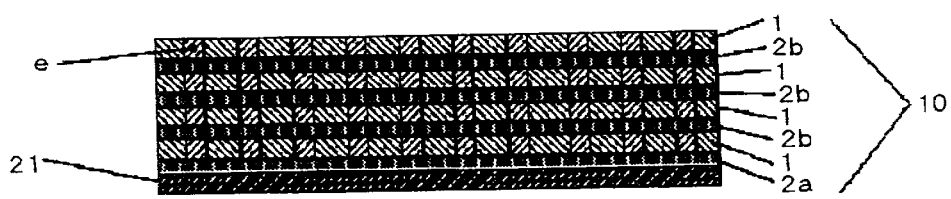
FIG. 2 is a sectional view of an example of a laminated optical diffusing plate.

Examples of optical diffusing plates of the present invention are shown in FIG. 1 and FIG. 2. Notation 1 shows an optical diffusing plate and 10 shows a laminated optical diffusing plate in which the optical diffusing plates 1 are laminated together. Each optical diffusing plate is a birefringent film that contains minute domains e in a dispersed state having different birefringent characteristics from each other. In addition, notation 2b shows an adhesive layer between laminated optical diffusing plates, 2a an adhesive layer that comprises an adhesive layer for an adherend, and 21 a separator that covers adhesive layer temporarily.

The optical diffusing plate of the present invention is manufactured by a suitable method, for example, as follows: a film is formed from a mixture of one kind or two kinds or more of base material polymers used as a base material of a birefringent film and one kind or two kinds or more of the above-mentioned positive uniaxial liquid crystal polymers used as a minute domain, and subsequently this film is aligned through stretching processing to obtain a minute domain of the liquid crystal polymer formed in the birefringent film having different birefringent characteristics from the birefringent film.

Suitable transparent polymer may be used as the above-mentioned base material polymer, and there is especially no limitation. As examples of the polymer, for example; polyester series polymers such as polyethylene terephthalate or polyethylene naphthalate; styrene series polymers such as polystyrene or acrylonitrile styrene copolymer (AS resin); olefin series polymers such as poly olefin which include polyethylene, polypropylene, cyclo-series, or norbornene structure, or ethylene propylene copolymers; carbonate series polymers; acrylics series polymers such as poly methylmethacrylate; vinyl chloride series polymers; cellulose series polymer such as cellulose diacetate or cellulose triacetate; amide series polymers such as nylon or aromatic polyamide; imide series polymers; sulfone series polymers; polyether sulfone series polymers; polyether ether ketone series polymers; poly phenylene sulfide series polymer; vinyl alcohol series polymer; vinylidene chloride series polymer; vinyl butyral series polymers; allylate series polymers; and poly oxy methylene series polymers; or blended mixtures of the above described polymers may be mentioned. Polymers, above all, comprising hydrocarbon without any polar group as ester group, ether group and carbonate group are preferable.

On the other hand, as a positive uniaxial liquid crystal polymer, for example, a side chain type liquid crystal copolymer comprising a monomer unit (a) containing liquid crystalline fragment side chain and a monomer unit (b) containing non-liquid crystalline fragment side chain may be mentioned.

As a fragment side chain in the above-mentioned monomer unit (a), for example, a side chain that has side chain part represented by a general formula (1): —Y—Z—A (where, Y represents a poly methylene chain or poly oxy methylene chain branched from main chain, and Z represents para-substituted cyclic compounds), may be mentioned.

In the above-mentioned general formula (1), Y represents a spacer group that gives flexibility, and comprises poly methylene chain —$(CH_2)_p$— or poly oxy methylene chain —$(CH_2CH_2O)_q$—. The numbers p and q of repetitions are suitably determined by chemical structure of mesogenic group Z bonded with it etc., and, generally p is an integer of 0 to 20, preferably 2 to 12, and q is an integer of 0 to 10, preferably 1 to 4.

As a preferable spacer group Y to form a birefringent film for controlling refractive index, for example, ethylene, propylene, butylene, pentylene, hexylene, octylene, decylene, undecylene, dodecylene, octadecylene, ethoxy ethylene, and methoxy butylene, etc. may be mentioned.

Z is para-substituted cyclic compound serving as mesogenic group that gives liquid crystal alignment, as examples of para-substituted aromatic unit and para-sustituted cyclohexyl ring unit, such as types of compounds; azomethyne type, azo type, azoxy type, ester type, tolane type, phenyl type, biphenyl type, phenyl cyclo hexyl type and bicylcohexyl type may be mentioned.

As a preferable para-substituted cyclic compound Z to form a birefringent film for controlling refractive index, compounds represented by following [Formula 1] may be mentioned.

[Formula 1]

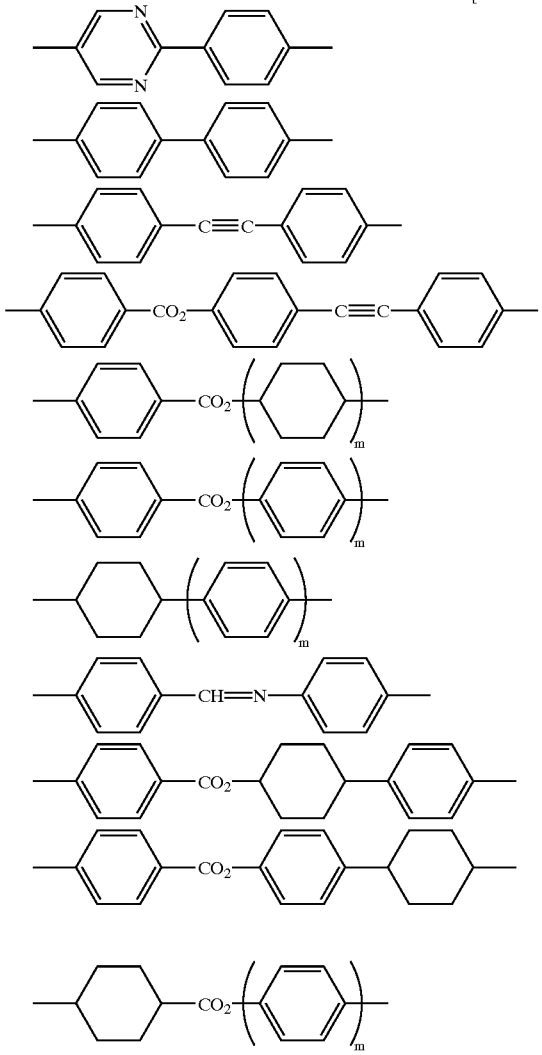

(Where m is 1 or 2.) In the above formulas, a spacer group Y and a mesogenic group Z may be bonded through ether linkage, i.e., —O—. Moreover, one or two hydrogen of phenyl group that forms para-substituted cyclic compound may be substituted by halogen, and in this case as a halogen chlorine or fluorine is preferable.

Moreover, terminal substituent group A in para-position of para-substituted cyclic compound Z may be suitable group, and for example; cyano group, alkyl group, alkenyl group, alkoxy group, oxa alkyl group, halogen group and haloalkyl group, haloalkoxy group, and haloalkenyl group with which one or more of hydrogen are substituted by fluorine or chlorine may be mentioned.

Therefore, the above-mentioned side chain type liquid crystal copolymer may be a copolymer that shows thermoplasticity and proper alignment, such as nematic phase and smectic phase, at room temperature or higher temperature.

In the fragment side chain in the above-mentioned monomer unit (a), it is preferable that at least one substituent selected from a group of alkoxy group, cyano group, fluoro group, and alkyl group is contained in a parallel direction (symmetrically) to a molecule length axis of the fragment side chain.

As the above-mentioned monomer unit (a), a monomer unit represented by the general formula (a): [Formula 2], for example, is mentioned as a preferable example.

[Formula 2]

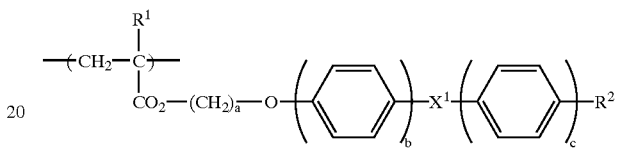

(Where, $R^1$ represents hydrogen atom or methyl group; a represents a positive integer of 1 to 6; $X^1$ represents —$CO_2$—group or —OCO—group; $R^2$ represents cyano group, alkoxy group with 1 to 6 of carbon, fluoro group, or alkyl group with 1 to 6 of carbon; and b and c represents integer of 1 or 2, respectively.

Moreover, the fragment side chain in the above-mentioned monomer unit (b) preferably has at least one substituent selected from a group of alkyl group, fluoro alkyl group, and alkoxy group. Control of refractive index characteristics and birefringent characteristics becomes possible using the monomer unit that has the fragment side chain with such a substituent.

As the above-mentioned monomer unit (b), a monomer unit represented by a general formula (b): [Formula 3], for example, may be mentioned.

[Formula 3]

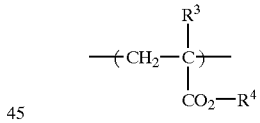

(Where, $R^3$ represents hydrogen atom or methyl group, $R^4$ represents alkyl group with 1 to 22 of carbon, fluoro alkyl group with 1 to 22 of carbon, or a substituent represented by a general formula (c): [Formula 4]).

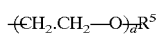 [Formula 4]

(Where, d represents a positive integer of 1 to 6 and $R^5$ represents alkyl group with 1 to 6 of carbon.) A monomer unit that has such a linear side chain and is represented by a general formula (b) is preferable in controlling refractive index characteristics and birefringent characteristics. An ordinary ray refractive index may be decreased, and at the same time birefringence may be decreased by increasing a percentage of monomer unit represented by the general formula (b).

A percentage of the monomer unit (a) and the monomer unit (b) is not especially limited. The percentage should be varied depending on a kind of the monomer unit, the preferable percentages of the monomer unit are (b)/{(a)+(b)}=0.01 to 0.8 (molar ratio), since increase in the percentage of the monomer unit (b) impairs development of birefringent characteristics of a side chain type liquid crystal copolymer. Moreover, it is preferable that a weight average molecular weight of a side chain type liquid crystal polymer is 2000 to 100000. In addition, a side chain type liquid crystal copolymer comprising the monomer units represented by the above described formulas [Formula 2] and [Formula 3] as a monomer unit (a) and a monomer unit (b) maybe prepared by copolymerizing an acrylics series monomer or a methacryl series monomer corresponding to the monomer units of the above-mentioned illustration.

A case of poly acrylate or poly methacrylate was illustrated for a side chain type liquid crystal copolymer in the above-mentioned description as a frame structure that forms main chain, a main chain of the present invention may be formed with proper combination of chains, such as linear, branched, or cyclic. As examples; poly alpha-haloacrylates, poly alpha-cyano acrylates, poly acrylamides, polyacrylonitriles, poly methacrylonitriles, polyamides polyesters, polyurethanes; polyethers, polyimides, and polysiloxanes may be mentioned.

In the above method, a base material polymer and the side chain type liquid crystal polymer preferably are used in combination wherein a phase separation is induced, in order that a minute domain formed in the optical diffusing plate obtained may develop excellent dispersibility and distribution property. Thus the dispersibility and distribution property may be controlled by a combination of those compatibilities. Phase separation maybe obtained using suitable methods, for example, by making materials with mutual non-compatibility into a solution state in a suitable solvent, and by mixing the materials under heated and melted phase.

In addition, in the above-mentioned stretching alignment processing method, when forming a birefringent film that contains the above-mentioned minute domain in a dispersed state, a target birefringent stretched film may be formed at arbitrary stretching temperature and at stretching ratio. Moreover the above-mentioned base material polymer has anisotropic polymers classified into positive and negative based on a characteristics of refractive index variation by the stretching direction, and both of the positive and negative anisotropic polymers may be used in the present invention.

Target films to which alignment processing is given may be prepared using proper methods, such as a casting method, an extrusion molding method, an injection molding method, and a roll forming method, the flow casting molding method. Moreover, a method may be used in which a developed monomer is polymerized with heat-treatment or radiation processing of ultraviolet radiation etc. to obtain a film.

A method in which a mixed solution of a base polymer and the liquid crystal polymer is prepared in some suitable solvent and subsequently the mixed solution is made into a film using a casting method or a flow casting molding method is preferable, because in the method a minute domain contained in a dispersed state in a birefringent film may have an advanced uniform distributed state. When this method is applied, the size and distributed state etc. of the minute domain may be controlled by the factors, such as a kind of solvent, a viscosity of the mixed solution, and a rate of drying of a mixed solution-developing layer. A method of lowering viscosity of mixed solution and a method of increasing the rate of drying of the mixed solution-developing layer etc. are advantageous to make a size of a minute domain considerably small.

Thickness of a film for alignment processing may be suitably determined, and, generally the thickness is 1 μm to 3 mm, preferably 5 μm to 1 mm and still more preferably 10 to 500 μm taking the easiness of alignment processing etc.

into consideration. In addition, when the film is formed, proper additives, such as a dispersant, a surface active agent, a UV absorbent, a color tone modifier, a flame retarder, a mold lubricant, and an antioxidant may be blended therein.

Alignment processing may be carried out using one or more of the following suitable methods that may control a refractive index by alignment: a method of stretching processing and rolling processing in uniaxial or biaxial and sequential biaxial or Z-axial direction; a method in which a material is impressed with electric field or magnetic field at a temperature equal to or more of glass transition temperature or of liquid crystal transition temperature followed by immediate cooling to fix alignment; a method in which a material is flowed and aligned at the time of film formation; and a method in which a side chain type liquid crystal copolymer is self-aligned based on a small degree of alignment of an isotropic polymer. Therefore, a birefringent film in containing a minute domain is contained in dispersed state may be a stretched film or an unstretched film. In addition, although in the case of a stretching film a brittle polymer may be used as a base material polymer, especially a polymer that is excellent in stretchability is desirable.

An optical diffusing plate of the present invention comprises a birefringent film containing the above-mentioned minute domain in dispersed state, and a refractive index difference ($\Delta n1$) between a birefringent film portion that has a base material polymer of the above-mentioned optical diffusing plate as composition element and a minute domain that has a side chain type liquid crystal copolymer as composition element is 0.03 or more in a direction orthogonal to the direction of axis that gives a maximum transmittance of a linearly polarized light, and moreover a refractive index difference ($\Delta n2$) in the direction of axis that gives a maximum transmittance is controlled to 80% or less of the above-mentioned $\Delta n1$. By being given such a difference of the refractive index, maintenance of outstanding scattered state in $\Delta n1$ direction (direction orthogonal to the above-mentioned direction of axis), and outstanding polarization state in $\Delta n2$ direction (the above-mentioned axial direction) is realized.

When taking into consideration transformation or cancellation of a polarization state based on scattering, a refractive index difference ($\Delta n1$) in the $\Delta n1$ direction preferably has a moderately large value of 0.04 to 1 and especially of 0.045 to 0.5. On the other hand, in order to maintain polarization state, a refractive index difference ($\Delta n2$) in the $\Delta n2$ direction has preferably small value, and it is preferably 0.03 or less, more preferably 0.02 or less and still preferably 0.01 or less.

Therefore, the above-mentioned alignment processing may also be defined as the operation that increases a refractive index difference between the above-mentioned birefringent film portion and the minute domain in $\Delta n1$ direction, as the operation that decreases in $\Delta n2$ direction, or as the operation of attaining the both.

In order to realize the above-mentioned uniform scattering effect etc., the minute domain in the above-mentioned optical diffusing plate may be dispersed and distributed in birefringent film as uniformly as possible. Since a size of minute domain, especially a length in the $\Delta n1$ direction, the scattering direction, is associated with a backscattering (reflection) or a wavelength dependability, a length of the minute domain in the $\Delta n1$ direction is preferably as small as possible, and it is preferably in the order of several micrometer taking controlling of the backscattering into consideration.

Taking into consideration having backscattering induced and increased, on the other hand, it is desirable that a diameter of the minute domain in the Δn1 direction may have a size in which Rayleigh scattering is induced. In order to induce Rayleigh scattering, it is desirable that the diameter of the minute domain is small enough to a wavelength of light. On the other hand, from a point of controlling the wavelength dependability of a scattering light, it is preferable that size of minute domain in the Δn1 direction is as large as possible, therefore it has an antagonistic relationship to the method of controlling the above-mentioned backscattering.

On the assumption of the above-mentioned backscattering and the wavelength dependability, etc. in order to solve various problems of, such as; increasing optical use efficiency, preventing chromaticity caused by wavelength dependability, preventing inhibition of clear display by viewing of the minute domain and further increasing film productivity and film strength, a preferable size of the minute domain, especially a length in the Δn1 direction is 0.05 to 500 μm, more preferably 0.1 to 250 μm and still more preferably 1 to 100 μm. In addition, although a minute domain usually exists in a birefringent film in a state of domain, there is especially no limitation for a length in the Δn2 direction.

As is described above, an optical diffusing plate of the present invention is given anisotropy in birefringence characteristics in the Δn1 direction and the Δn2 direction, and a linearly polarized light is controlled by difference of the oscillating plane. A percentage occupied by the minute domain in the optical diffusing plate may properly be determined based on the scattering nature in the Δn1 direction etc., it is 0.1 to 70 weight %, preferably 0.5 to 50 weight % and more preferably 1 to 30 weight %.

An optical diffusing plate of the present invention may comprise a single layer of birefringent film containing minute domains in a dispersed state having different birefringent characteristics as is shown in FIG. 1, and may comprise a laminated multi-layer of the optical diffusing plate 1 as is show in FIG. 2. A cumulative scattering effect beyond increase in thickness is demonstrated using such laminating method, and when combined with a polarizing plate, a larger amount of transmitted light through polarizing plate than reflection loss may be advantageously obtained.

Although laminated body may be configured by optical diffusing plates laminated at arbitrary aligning angles in Δn1 direction or Δn2 direction, when an increase of scattering effect is desired, the upper and lower layers may be preferably laminated so that their Δn1 direction may have mutually parallel relationship. The number of laminating of the optical diffusing plates may be properly determined as two or more.

Moreover, Δn1 and Δn2 of each optical diffusing plate to be laminated may be equal or different from each other. In addition, the relationship between upper and lower layers in Δn1 direction etc. is preferably as parallel as possible, a gap by work error etc. is permitted. Moreover, when Δn1 direction etc. has variation, the average direction is adopted.

Each optical diffusing plate in laminated multi-layer may only be piled up without any treatment, but preferably maybe adhered through an adhesive layer etc. in order to prevent Δn1 direction etc. might shift or any foreign matter etc. might enter into each interface. Proper adhesives, such as, for example, hot melt type and pressure sensitive adhesion type, may be used for adhesion. In order to reduce reflective loss, adhesive layer that has as small as refractive index difference with optical diffusing plate is preferable, and adhesion may also be carried out using the base material polymer itself or the side chain type liquid crystal polymer that forms the minute domain.

An optical diffusing plate of the present invention, making efficient use of the characteristics showing transmittance and scattering properties of linearly polarized light, may be used, for example, in various kinds of uses, such as a polarization amplification plate, color controlling panel, polarized light separation plate, display characteristics control plate, and liquid crystal display screen, and polarized light auxiliary plate.

In the above-mentioned polarization amplification plate, an optical diffusing plate that has a small backscattering and a strong light scattering property is configured in the incident light side of polarizing plate, and the scattering property (Δn1 direction) is utilized to transform the polarization direction. Consequently, an amount of linearly polarized light which has transmittance in Δn2 direction is increased, and a polarization degree and an optical use efficiency are expected to be enhanced. Moreover, a color control panel amplifies the polarization of blue region and aims at adjustment of color balance while preventing yellowing of a display by configuring an optical diffusing plate with a high wavelength dependability on the surface of a reflected type liquid crystal display with low blue transmittance.

In polarization separation plate, an optical diffusing plate that shows a scattering near Rayleigh scattering is configured between a light leading plate and a polarizing plate, and after canceling a polarization of backscattering light thereby, the light is introduced again into the polarizing plate through the reflective layer at the bottom of light leading plate etc. Using the above-mentioned configuration it is expected that the amount of the linearly polarized light with transmittance in the Δn2 direction is increased and the degree of polarization or in optical use efficiency is improved.

A display characteristics control plate is used for the purpose that white display is scattered and black display is transmitted to make contrast and clarity of picture improved, by configuring an optical diffusing plate which has a few backscattering and a high haze anisotropy between a liquid crystal cell and a polarizing plate in the viewing side. A liquid crystal display screen aims at improvement in contrast, using an optical diffusing plate as a screen transmitting selectively a specified linearly polarized light in incident light. A polarized light auxiliary plate is used for the purpose of controlling absorption of incident light by a polarizing plate and preventing temperature rise of the polarizing plate by configuring an optical diffusing plate having a high haze anisotropy between the polarizing plate and light sources inside of a display.

Figure 3:
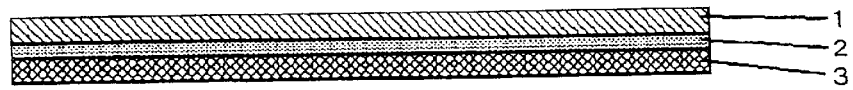
FIG. 3 is a sectional view of an example of an optical element.

Therefore, in practical use, an optical diffusing plate of the present invention may also be used as an optical element that comprises a laminated material in which an optical diffusing plate is configured at one side or both sides of suitable optical parts, such as a polarizing plate and/or a retardation plate. An example is shown in FIG. 3. Notation 3 is an optical part. This laminated layer may only be piled up without any treatment, and may also be adhered through an adhesive layer etc. As an adhesive layer, the adhesive layer used in laminating of each above-mentioned optical diffusing plate may be used.

There is especially no limitation in optical parts used for the above-mentioned lamination and, for example, proper parts, such as a polarizing plate, a retardation plate, a backlight such as a light leading plate, a reflective plate, a polarized light separation plate that comprises multilayer film, etc., and a liquid crystal cell, may be used. Moreover, optical parts, such as a polarizing plate and retardation plate, may be of various kinds of types.

That is, as a polarizing plate, various kinds of types, such as an absorbing type, a reflecting type, and a scattering type, may be used; and as a retardation plate, various kinds of types, such as a quarter wavelength plate, a half wavelength plate, an uniaxial and biaxial stretched film type, and an oblique alignment film type aligned further in thickness direction, a liquid crystal polymer type and a type in which the above-mentioned types are laminated may be used in the present invention.

As examples of the polarizing plate described above, a polyvinyl alcohol series film; a partially formalized polyvinyl alcohol series film; an absorbed type polarizing plate in which dichroism substances, such as iodine and a dichroism dye, domainbsorbed in a hydrophilic polymer film like a partially saponified film of ethylene/vinyl acetate copolymer series polymer and subsequently stretched; a poly-ene aligned film such as a dehydrated compound of polyvinyl alcohol; or a dehydrochlorinated compound of polyvinyl chloride etc. may be mentioned.

Moreover, a polarizing plate on which a transparent protective layer comprising a coated layer of plastics and a laminated layer of a film etc. are prepared in order to retain water resistance on one side or both sides of the above-mentioned polarizing film. Furthermore, a polarizing plate with a fine concavo-convex structure on the surface may be mentioned in which transparent fine-grains having an average grain size of 0.5 to 20 $\mu$m, such as inorganic fine-grain, which may have conductivity, of silica, alumina, titania, zirconia, tin oxide, indium oxide, cadmium oxide, antimony oxide, etc., and organic fine-grain of cross-linked or non cross-linked polymer, in the transparent protection layer are contained.

On the other hand, as examples of a retardation plate, a stretched film comprising base material polymer shown in the example of the above-mentioned birefringent film, a liquid crystal polymer, and most of all a retardation plate comprising a twist alignment liquid crystal polymer etc. may be mentioned. Furthermore, as an example of a light leading plate, a light leading plate may be mentioned wherein light sources, such as a linear light source as a cathode-ray tube (cold or hot type), a light emitting diode and EL, are configured on the side of a transparent resin plate, and a constitution in which the light transmitted inside of a plate is emitted from one side of the resin plate by the action of diffusion, reflection, diffraction, interference, etc. is adopted.

When an optical element containing a light leading plate is assembled, one or more auxiliary means, such as a prism array layer comprising a prism sheet for controlling the emitting direction of light etc., a diffusing plate for obtaining uniform light emission, and a linear light-source holder for leading the emitted light from a light source to the side of a light leading plate, are configured in predetermined positions, such as in upper or lower side and in lateral side, of a light leading plate if necessary to obtain a suitable assembled body.

The laminated layer that forms the optical element of the present invention may be a laminated layer comprising one kind of optical parts, and may be a laminated layer comprising two or more kinds of optical parts. Moreover, for example, in the laminated layer of the present invention, two or more layers of the same kinds of optical parts, such as a retardation plate, may be laminated together, and in this case, the optical parts as a retardation plate etc. may have the same or different characteristics. As for the optical diffusing plate used into the optical element, one or more of plates may be configured on one or both of outer the surface of a laminated layer, or in the proper position outside or inside of laminated layers, such as on one side or both sides, of the optical parts configuring the laminated layer.

When an optical element contains a polarizing plate, in order to utilize effectively transmission and scattering characteristics of an optical diffusing plate, the optical diffusing plate is preferably configured so that the $\Delta n2$ direction may have a parallel relationship with a transmission axis of the polarizing plate. The parallel relationship may be applied correspondingly for the case of laminating the above-mentioned birefringent film. In the optical element with this configuration, a linearly polarized light absorbed by the polarizing plate will be scattered through the $\Delta n1$ direction of optical diffusing plate. Therefore, such an optical element can be preferably used for a polarization amplification plate, a polarization separation plate, the above-mentioned liquid crystal display screen and the above-mentioned polarization auxiliary plate, etc.

In addition, as a polarizing plate for configuring an optical element, in order to improve brightness or contrast, a polarizing plate with high polarizing degree such as an absorbed type polarizing plate containing the above-mentioned dichroism substance etc., especially a polarizing plate with 40% or more of light transmittance, and with 95.0% or more, preferably 99% or more of polarizing degree is used.

Figure 4:
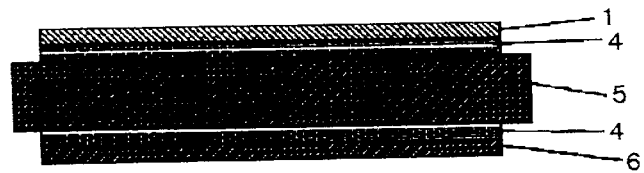
FIG. 4 is a sectional view of an example of a liquid crystal display.
Figure 5:
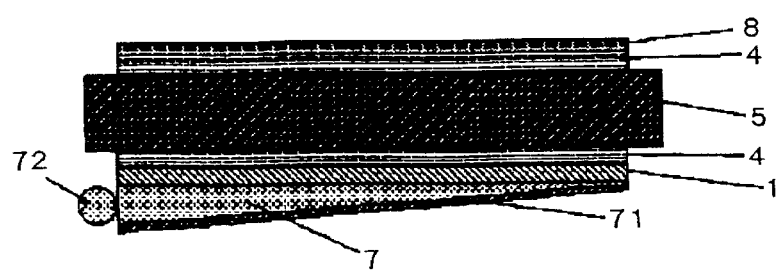
FIG. 5 is a sectional view of an example of other liquid crystal display.

Since the optical diffusing plate and optical element of the present invention have the above-mentioned feature, they may be preferably used for formation of a liquid crystal display. An example of a liquid crystal display is shown in FIG. 4 and FIG. 5. Notation 4 shows a polarizing plate, 5 a liquid crystal cell, 6 a diffuse-reflection plate, 7 a light leading plate, 71 a reflective layer, 72 a light source and 8 shows an optical diffusing plate for diffusing viewing light.

The above-mentioned FIG. 4 shows a reflected type liquid crystal display. The optical diffusing plate 1 is configured so that $\Delta n2$ direction may have a parallel relationship to the transmission axis of the polarizing plate on the outside of the polarizing plate 4 in a viewing side. On the other hand, FIG. 5 shows a transmitted type liquid crystal display. The optical diffusing plate 1 is configured so that $\Delta n2$ direction may have a parallel relationship to the transmission axis of the polarizing plate, between the light leading plate 7 forming a backlight and the polarizing plate 4 on the back side in a viewing side.

Generally several composition parts, such as a polarizing plate, a liquid crystal cell, a reflective plate or a backlight, and if necessary other optical parts, such as optical parts, are suitably assembled with a drive circuit incorporated to obtain a liquid crystal display. In the present invention, there is especially no limitation except for the point of using the above-mentioned optical diffusing plate or optical elements, and a liquid crystal display of the present invention may be assembled using conventional method. Therefore, when a liquid crystal display is assembled, suitable optical parts, such as an optical diffusing plate laid on the polarizing plate in the viewing side, an anti-glare layer, an antireflection film, a protection layer, a protection plate, and the compensation plate laid between a liquid crystal cell and polarizing plates in the viewing side, may suitably be configured.

As described above, the above-mentioned compensation plate is used in order to compensate birefringent wavelength dependability etc. and to improve visibility, and is configured between a polarizing plate in the viewing side and/or in the side of a backlight and a liquid crystal cell etc. In addition, as a compensation plate, suitable parts, such as the above-mentioned retardation plate, may be used based on a wavelength region etc. Moreover, the compensation plate may comprise two or more layer of retardation layers.

In the above case, one layer or two or more layers of optical diffusing plate or an optical element, being considered as one unit, may be configured in the suitable position on one side or both sides of a liquid crystal cell. In a liquid crystal display configured so that the $\Delta n2$ direction of optical diffusing plate and the transmission axis of polarizing plate may have a parallel relationship, one layer or two layers or more of optical diffusing plate may be configured, for example, in a reflected type liquid crystal display in incident light side of the polarizing plate especially of the polarizing plate in viewing side, or in a transmitted type liquid crystal display in a suitable position between the polarizing plate on the back side of viewing side and the backlight. In addition, the suitable position here means a suitable position where it is desired that a polarization of the linearly polarized light absorbed by the polarizing plate is transformed by scattering.

In addition, when the above-mentioned optical diffusing plate is configured, the optical diffusing plate may be used, as mentioned above, as an optical element laminated and combined with adjacent optical parts etc. Moreover, in a liquid crystal display, each composition element may preferably be adhered and combined through adhesive layers as in the case of the above-mentioned optical diffusing plate of the present invention.

EXAMPLE

The present invention is explained below referring to examples below; the present invention is not limited to these examples. In addition, a part in each example represents weight part.

Example 1

A 20 weight % solution in dichloro-methane containing a norbornene series resin (product by JSR Corporation, brand name ARTON) 100 parts as base material polymer of birefringent film and 6 parts of a side chain type liquid crystal polymer represented by the [Formula 5] (where n=35, represents molar % of monomer unit, and shown in block for convenience. Weight average molecular weight: 10500) are mixed together. The mixture was cast to form a film with a thickness of 100 μm by a cast method. The film obtained was stretched at a stretching ratio of two at 175° C. to obtain an optical diffusing plate comprising a birefringent film that contains a minute domain of the above-mentioned a side chain type liquid crystal polymer in dispersed state.

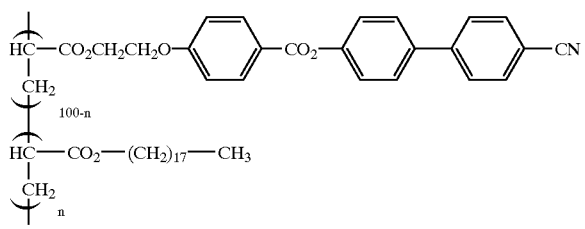

[Formula 5]

In the above-mentioned birefringent stretched film, a norbornene series resin forms a film, in which a side chain type liquid crystal polymer is dispersed having a shape of a domain in the form with a long axis in the stretching direction to form a minute domain. Using a method of observing chromaticity caused by a difference in phase difference resulting from a minute alignment turbulence in a liquid crystal polymer within a domain, a measuring was carried out using a polarization microscope to obtain an average diameter of the domain. The average diameter obtained showed about 6 μm in length in the $\Delta n1$ direction.

The refractive index difference ($\Delta n1$) of the optical diffusing plate gave 0.108, and the refractive index difference ($\Delta n2$) gave 0.010.

In addition, the refractive index in the $\Delta n1$ direction of the film obtained by being stretched at a stretching ratio of two in the above-mentioned norbornene series resin gave 1.512, and the refractive index in the $\Delta n2$ direction gave 1.510. Moreover, the refractive index (extraordinary ray refractive index) in the $\Delta n1$ direction of the side chain type liquid crystal polymer gave 1.620, and the refractive index (ordinary ray refractive index) in the $\Delta n2$ direction gave 1.520.

Measurement of refractive index was performed for each of the single film using Abbe refractometer 1T type made by Atago Co., Ltd. respectively. Norbornene series resin film was measured without any pre-treatment. After 20% solution of a polyimide in N-methyl pyrolidone was spin-coated on a glass substrate containing lead under a condition of 2000 rpm and for 10 seconds and was heated at 300° C. for 1 hour, a rubbing treatment was carried out to the coated substrate to obtain an alignment film. Thus, after a solution of a side chain type liquid crystal polymer in cyclohexanone (26 weight %) was spin-coated on the above-mentioned alignment layer, the coated substrate was heated at 160° C. to obtain an aligned side chain type liquid crystal polymer for measuring.

Example 2

Two birefringent films manufactured according to Example 1 were laminated and adhered together through acrylics series adhesive layer with thickness of 20 μm so that the $\Delta n2$ directions of the films correspond to obtain an optical diffusing plate.

Example 3

The optical diffusing plate obtained in Example 1, and a commercially available polarizing plate that has 41% of a total light transmittance and 99% of a polarization degree of transmission light was adhered together through an acrylics series adhesive layer so that the $\Delta n2$ direction corresponds with the transmission axis to obtain an optical element.

Example 4

On a diffuse reflection plate, a polarizing plate, a TN liquid crystal cell, and the optical element obtained in Example 3 were adhered one by one through an acrylics series adhesive layer so that the polarizing plate is configured at cell side to obtain a reflected type liquid crystal display as in FIG. 4. In addition, the polarizing plate was configured so that the direction of the transmission axis may correspond with each rubbing direction that meets liquid crystal cell.

Comparative Example 1

An optical diffusing plate comprising a birefringent film with a refractive index difference ($\Delta n1$) of 0.333 and a refractive index difference ($\Delta n2$) of 0.035 was obtained following the same method as in Example 1 except that a side chain type liquid crystal polymer represented by the [Formula 6] below (weight average molecular weight: 8900) was used.

[Formula 6]

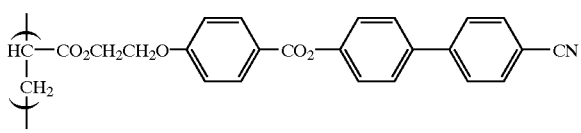

In addition, a refractive index (extraordinary ray refractive index) of the Δn1 direction of the above-mentioned side chain type liquid crystal polymer gave 1.845, and a refractive index (ordinary ray refractive index) of the Δn2 direction gave 1.545. In the above-mentioned birefringent film, a norbornene series resin serves as a base film wherein a side chain type liquid crystal polymer is dispersed to form a minute domain in domain form in a shape with a major axis in the stretching direction. The average diameter obtained showed about 6 μm in length in the Δn1 direction.

Comparative Example 2

In Example 3, the same method was followed except that an optical diffusing plate obtained in Comparative Example 1 was used as an optical diffusing plate to obtain an optical element.

Evaluation Test 1

A total light transmittance, a diffusion transmittance, and a haze were measured for the optical diffusing plates and optical elements obtained in Examples and Comparative Examples using Poick integrating sphere type haze meter based on ASTM-D 1003-61. Moreover, the degree of polarization of all transmitted light was also investigated, and the result was shown in Table 1. In addition, as for an optical element, the incident light had to enter from a polarizing plate and an optical diffusing plate side, and a value in case from the optical diffusing plate side was shown in parentheses.

TABLE 1

| | Total light transmittance (%) | Polarization degree(%) | Diffusion transmittance (%) | Haze (%) |
|---|---|---|---|---|
| Example 1 | 87 | 48 | 34 | 39 |
| Example 2 | 83 | 58 | 46 | 55 |
| Example 3 | 41 (55) | 99 | 3 (12) | 8 (22) |
| Comparative Example 1 | 91 | 50 | 55 | 60 |
| Comparative Example 2 | 41 (51) | 99 | 4 (14) | 10 (27) |

Results of Table 1 show that optical diffusing plates with polarizing function are obtained (Examples 1 and 2) And also they show that although the birefringent films are laminated up and therefore a total light transmittance is decreased by reflective loss (Examples 1 and 2), an increase in quantity of total light transmittance of more than reflective loss was obtained in case of combined with polarizing plate, and the linearly polarized light transmitting through the polarizing plate was improved by leaps and bounds by scattering of the linearly polarized light absorbed by the polarizing plate (Example 3). From the result of comparison in Example 3 wherein the direction of incident light was changed, the total light transmittance was improved by entering the light from optical diffusing plate side as compared with the case of using only polarizing plate (41%).

Furthermore, the degree of improvement in the total light transmittance is more effective in the case where a side chain type liquid crystal copolymer is used (Example 1) than in the case where a side chain type liquid crystal polymer consisting of a single monomer unit is used (Comparative Example 1. This result shows that the polarization characteristics is improved using a side chain type liquid crystal copolymer of the present invention as a liquid crystal polymer that constitutes an optical diffusing plate with polarization function.

Evaluation Test 2

When a brightness of the liquid crystal display obtained in Example 4 was measured in displaying state using a brightness meter, a significant improvement in brightness was confirmed compared with the case where only polarizing plate is used.

What is claimed is:

1. An optical diffusing plate comprising a birefringent film and a minute domain with a birefringent characteristic different from the birefringent film in a dispersed state in the birefringent film, the minute domain comprising a side chain type liquid crystal polymer comprising a monomer unit (a) containing a liquid crystalline fragment side chain and a monomer unit (b) containing a non-liquid crystalline fragment side chain, and a refractive index difference (Δn1) between the birefringent film and the minute domain in a direction orthogonal to a direction of axis that gives a maximum transmittance of linearly polarized light being 0.03 or more, and a refractive index difference (Δn2) in a direction of axis that gives a maximum transmittance being 80% or less of the Δn1.

2. The optical diffusing plate according to claim 1, wherein the minute domain is distributed in a dispersed state caused by phase separation, and a length in Δn1 direction of the minute domain (direction orthogonal to the axial direction) is from 0.05 to 500 μm.

3. The optical diffusing plate according to claim 2, wherein the length in Δn1 direction of the minute domain is from 1 to 100 μm.

4. An optical diffusing plate wherein two or more of the optical diffusing plates according to claim 1 are laminated so that the Δn1 direction of an upper layer and a lower layer might have a mutually parallel relationship.

5. An optical element comprising a laminated layer of at least one kind selecting from a polarizing plate and a retardation plate, and the optical diffusing plate according to claim 1.

6. An optical element according to claim 5, a transmission axis of a polarizing plate and a Δn2 direction of an optical diffusing plate (the axial direction) has a mutually parallel relationship.

7. A liquid crystal display comprising the optical element according to claim 5, on one side or both sides of liquid crystal cells.

8. A liquid crystal display comprising the optical diffusing plate according to claim 1 on one side or both sides of liquid crystal cells.

9. The optical diffusing plate according to claim 1, wherein the monomer unit (b) is represented by the following general formula (b):

General formula (b)

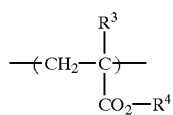

wherein, $R^3$ represents hydrogen atom or methyl group, $R^4$ represents alkyl group with 1 to 22 of carbon, fluoro alkyl group with 1 to 22 of carbon, or a substituent represented by the following general formula (c),

  General formula (c)

wherein, d represents a positive integer of 1 to 6 and $R^5$ represents alkyl group with 1 to 6 of carbon.

10. The optical diffusing plate according to claim 1, wherein the molar ratio of the monomer unit (a) and the monomer unit (b) is $(b)/\{(a)+(b)\}=0.01$ to 0.8.

11. The optical diffusing plate according to claim 1, wherein the refractive index difference ($\Delta n1$) is from 0.04 to 1.

12. The optical diffusing plate according to claim 1, wherein the refractive index difference ($\Delta n1$) is from 0.045 to 0.5.

13. The optical diffusing plate according to claim 1, wherein the refractive index difference ($\Delta n2$) is 0.03 or less.

14. The optical diffusing plate according to claim 1, wherein the refractive index difference ($\Delta n2$) is 0.02 or less.

15. The optical diffusing plate according to claim 1, wherein the monomer unit (a) is represented by the following general formula (1):

—Y—Z—A  General formula (1)

wherein, Y represents a poly methylene chain or poly oxy methylene chain branched from main chain, Z represents para-substituted cyclic compounds, and A represents a substituent selected from the group consisting of a cyano group, alkyl group, alkenyl group, alkoxy group, oxa alkyl group, halogen group, and haloalkyl group, haloalkoxy group, and haloalkenyl group with which one or more of hydrogen are substituted by fluorine or chlorine.

16. The optical diffusing plate according to claim 15, wherein said Y is selected from the group consisting of ethylene, propylene, butylene, pentylene, hexylene, octylene, decylene, undecylene, dodecylene, octadecylene, ethoxy ethylene, and methoxy butylene.

17. The optical diffusing plate according to claim 15, wherein said Z is selected from the following structures:

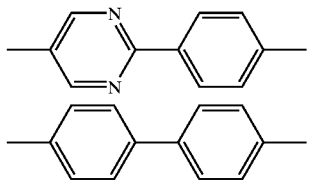

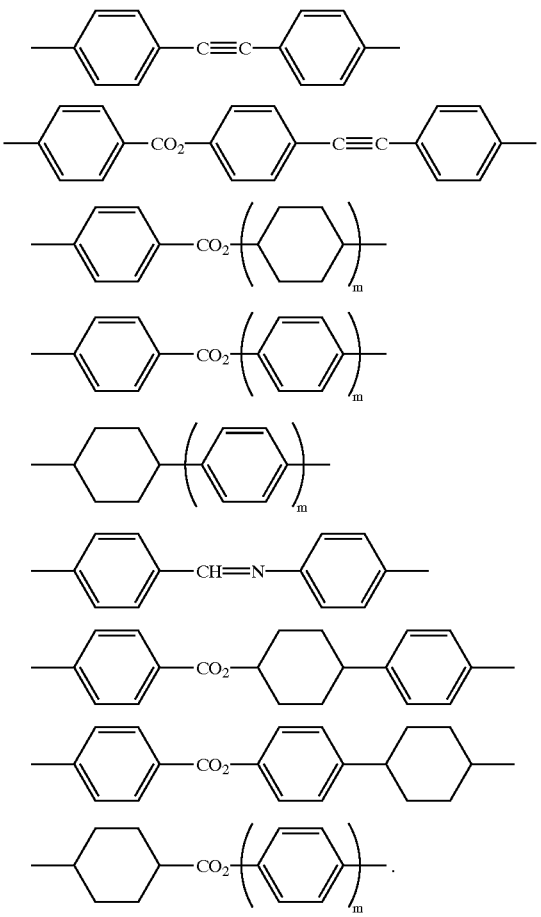

18. The optical diffusing plate according to claim 1, wherein the monomer unit (a) is represented by the following general formula (a):

General formula (a)

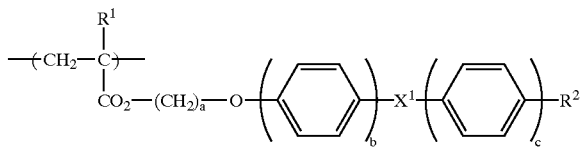

wherein, $R^1$ represents a hydrogen atom or methyl group; a represents a positive integer of 1 to 6; $X^1$ represents —$CO_2$-group or —OCO-group; $R^2$ represents a cyano group, alkoxy group with 1 to 6 of carbon, fluoro group, or alkyl group with 1 to 6 of carbon; and b and c represent an integer of 1 or 2, respectively.

* * * * *